June 20, 1939.   T. A. McMAHON ET AL   2,163,345
CROZING MACHINE
Original Filed Aug. 15, 1936    3 Sheets-Sheet 1
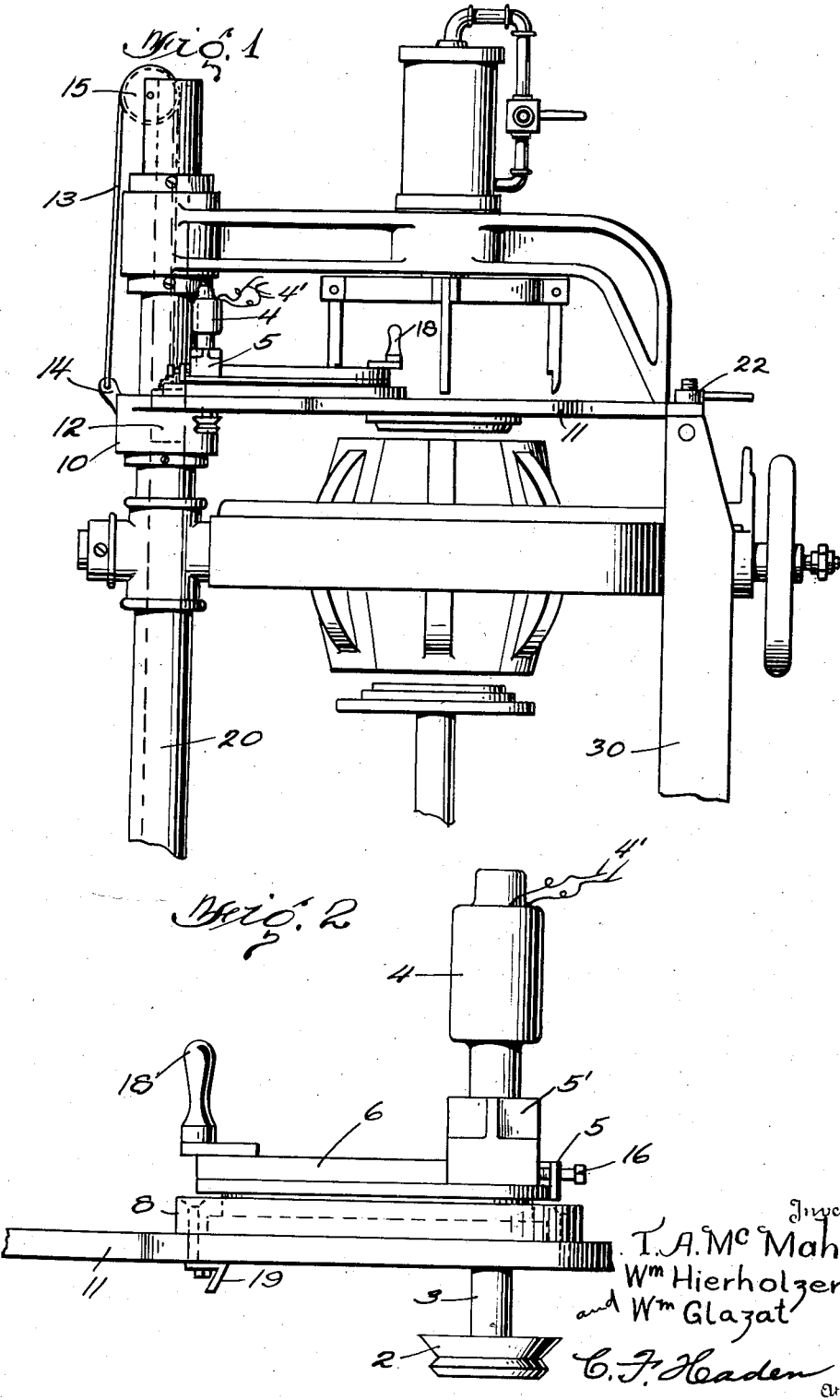
Inventors
T. A. McMahon,
Wm Hierholzer
and Wm Glazat
C. F. Haden
Attorney

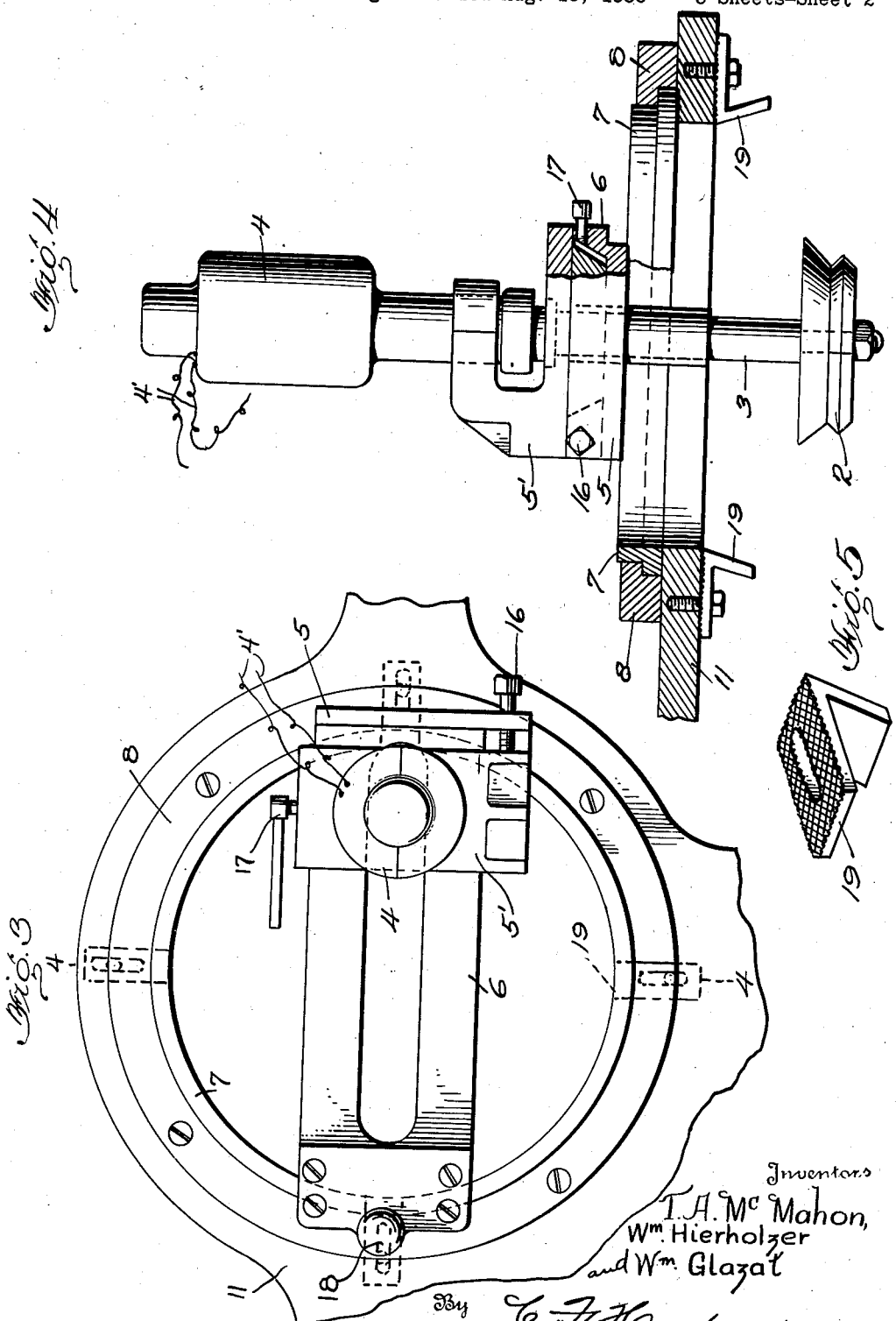

June 20, 1939.  T. A. McMAHON ET AL  2,163,345
CROZING MACHINE
Original Filed Aug. 15, 1936  3 Sheets-Sheet 3
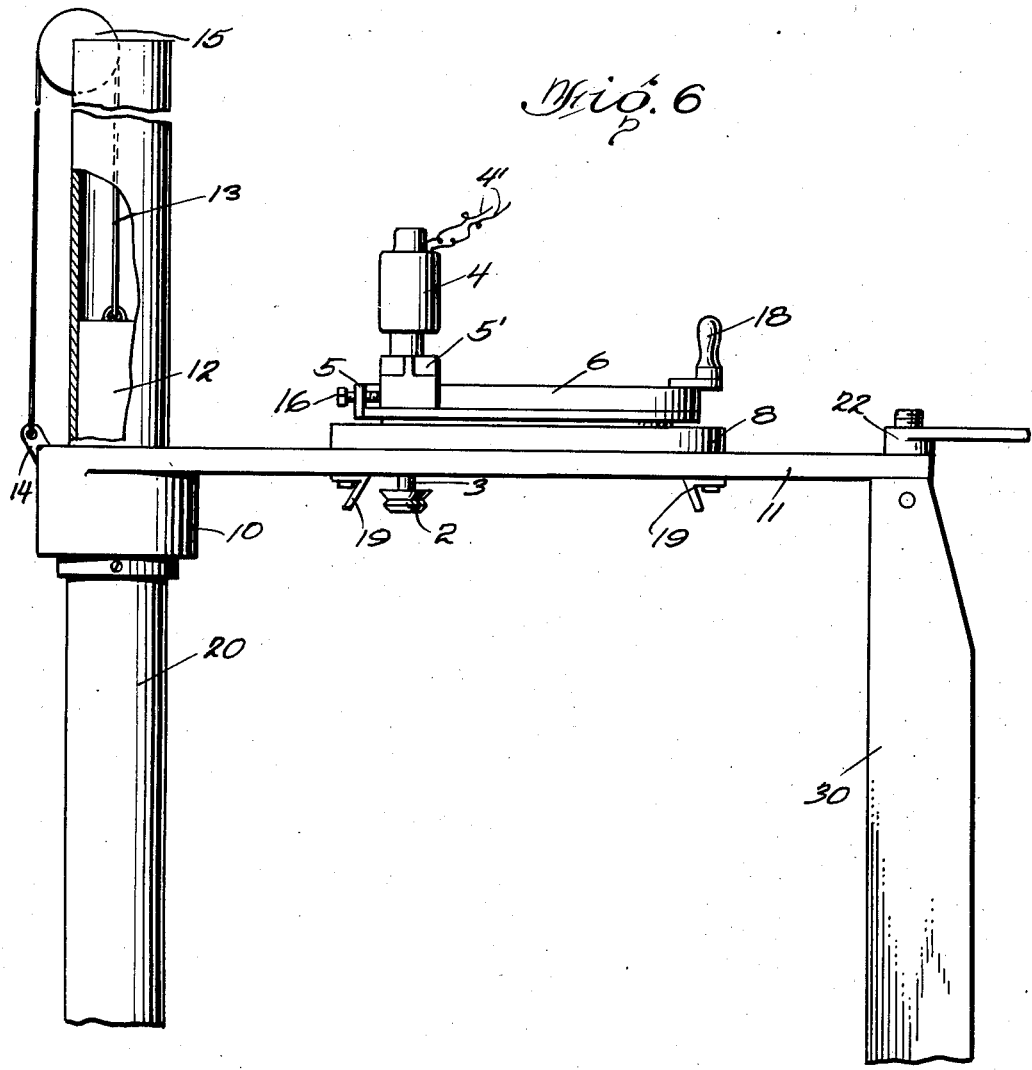
Inventors
T. A. McMahon,
Wm Hierholzer
and Wm Glazat
By C. F. Haden  Attorney Patented June 20, 1939

2,163,345

UNITED STATES PATENT OFFICE 2,163,345

CROZING MACHINE

Teaphel A. McMahon, William Hierholzer, and William Glazat, Grand Haven, Mich.

Original application August 15, 1936, Serial No. 96,296. Divided and this application September 22, 1937, Serial No. 165,176

1 Claim. (Cl. 147—13)

This application is a division of application Ser. No. 96,296 filed by us August 15, 1936, for a Barrel making machine, and is filed in compliance with the Office's requirement for division dated October 14, 1936.

The invention pertains to the coopering art, and particularly to barrel making.

In this specification we have used the term barrel in its most comprehensive or general sense, intending to include thereunder, kegs, buckets, kits, firkins and all other hollow receptacles made of staves in which the closure members or heads of the ends are held in place by being seated in a croze.

A croze is the continuous notch or groove near the ends of the inside of the staves of which a barrel is composed and in which the head of the barrel is seated and held.

The principal object of the invention is to provide an independently driven croze cutting tool which may be moved into and out of operating position without interfering with any of the other operations of a barrel making machine.

Another object is to so mount the device that the cutting tool may be adjusted to cut any desired number of crozes of precisely the same depth and circumference so that any one of a plurality of previously prepared identical heads will fit, interchangeably, in any of the crozes without special individual fitting.

Another object is to provide a croze cutting tool that will make a perfect finished croze and chine by a single revolution of the tool about the inside of a barrel.

Another object is to provide a croze cutting device in which the tool, invariably, travels in a perfect circle.

Another object is to provide a croze cutter in which the circle traveled by the cutting tool may be varied in diameter by adjustment within reasonable limits.

Another object is to provide a croze cutting machine in which the carrier of the cutting tool may be removed so that it may be replaced by other tool carrying elements which carry the cutting tool in circles which are greater or less in size than the capacity of the standard machine.

Other objects will appear as the description of the machine proceeds.

To illustrate the best method to practice the invention now known to us we have filed as a part of this specification three sheets of drawings in which the same figures of reference, wherever used, indicate the same elements, and in which Figure 1 is a diagrammatic view in elevation of our crozing device and the related co-operating parts of the Barrel making machine which is the subject of the parent application, 96,296, August 15, 1936, of which this is a division.

Fig. 2 is an elevational view of a part of the carrying plate with the crozing device mounted thereon.

Fig. 3 is a plan view of the parts shown in Fig. 2, but drawn upon a larger scale.

Fig. 4 is a view similar to the view in Fig. 2, but drawn on a larger scale and showing some parts in section.

Fig. 5 is a detail showing a perspective view of the adjustable barrel centering and clamping elements.

Fig. 6 is an elevational view of the invention as developed independently of the barrel making machine.

Fig. 7 is a detail of the right hand end of the carrying plate of Figure 6.

Fixed in an upright position and properly spaced are a pillar 20 and a pedestal 30.

Pillar 20 is preferably hollow to serve as a housing for a counter balance 12. This counter balance should be just sufficient to hold a carrying plate and its related parts in any position to which it is lifted or lowered.

Pillar 20 and pedestal 30 may be portions of our barrel making machine Ser. No. 96,296, filed August 15, 1936, as shown in Figure 1 or they may be parts of an independent crozing machine as illustrated in Figure 6.

Swingably and slidably mounted upon pillar 20 is a carrying plate 11 having fastened thereto or integral therewith a collar 10 surrounding pillar 20. The operating parts of our crozing machine are mounted upon carrying plate 11. When carrying plate 11 is a part of our barrel making machine it is V-shape and one arm of the plate carries the crozing elements and the other arm of the V-shape carrying plate carries a barrel head locating device as fully explained in our barrel making machine application 96,296, August 15, 1936.

Carrying plate 11 extends from pillar 20 to pedestal 30 and it has a notch 21 (see Fig. 7) in its swinging end into which a swinging locking latch 22 takes to hold the carrying plate rigidly fixed during the croze cutting operation.

Mounted upon carrying plate 11 is a removable undercut circular bearing ring 8 and rotatably mounted in the undercut part of bearing ring 8 is an annular member 7.

Circular bearing ring 8 and annular member 7 may be provided with anti-friction bearing elements if desired. We have not found it necessary to employ such anti-friction devices because if the parts are well lubricated annular member 7 turns with sufficient freedom in bearing ring 8.

Fixed to annular member 7 at diametrically opposite points is a motor-carrying cross-bar 6 upon which is adjustably located bracket 5 having bearings in which the rotatable shaft 3 of an electrically driven motor 4 is located.

Motor 4 is operated by current conveyed to it from a suitable source of electricity by loosely hanging conductors 4', so that it may be revolved with annular member 7 as the croze cutting tool is carried around the inside of a barrel.

Removably mounted upon the shaft 3 is a cutter 2 of the desired shape to make the croze and to simultaneously form the chine of the barrel.

Carrying plate 11 and the crozing machine mounted thereon are accurately counter-balanced by a weight 12, housed inside of pillar 20. A cable 13 is attached to weight 12 and extends upwardly and near the top of pillar 20 it passes over a pulley 15 and then downwardly where its other end is fixed to a lug 14 provided for that purpose on collar 10. To get satisfactory results it is necessary that the barrel be held rigidly and unyieldingly while the cutter is revolved around the inside of the barrel during the cutting of the croze. If it is not held in a fixed position the croze will vary in depth and, because the barrel gives unequally under the pressure of the cutting element, the croze will not be perfectly circular and the fit of the head in the croze will not be liquid tight.

When the invention is developed as an integral part of our barrel making machine the stave bending dies perform the function of barrel holding clamps (Fig. 1), as fully described in our parent application Ser. No. 96,296, August 15, 1936; but when the invention is developed independently of the barrel making machine (Fig. 6), adjustable centering and clamping elements 19 are provided on the under side of carrying plate 11 (Figures 3, 4, 5 and 6) which are brought down from above and engage the upper end of the barrel being operated upon with a sort of camming or wedging action and hold it unyieldingly in a fixed position during the cutting of the croze.

In order that the barrel may be held in a fixed position, unyieldingly in all directions during the cutting of the croze a plurality of clamping and centering elements 19, properly spaced about the upper end of the barrel, must be employed. In Fig. 3 four such clamping elements 19 are indicated in dotted lines; but we have found that three clamping elements 19 equally spaced 120 degrees apart about the barrel are ample. However the exact number of clamps 19 is not an essential of our invention, it being merely necessary to have a number sufficient to hold the barrel unyieldingly in all directions during the cutting of the croze. It will be obvious that crozes of the exact depth and circumference desired will not be produced unless the barrel is held in a fixed unyielding position during the entire revolution of the cutting tool around the inside of the barrel.

As shown in Figures 3 and 4 the motor with its cutter carrying shaft is mounted upon an adjustable slide 5' on bracket 5 in order that adjustments of extreme exactness may be made by the manipulation of the set screws 16 and 17.

The operation is as follows:

A sufficient number of staves to form the wall of a barrel are properly placed in our barrel making machine, Ser. No. 96,296, August 15, 1936; the stave bending dies are operated and the staves are forced into proper shape and position; while held in that position by the stave bending dies carrying plate 11 is lifted sufficiently for cutter 2 to be swung over the top end of the barrel and be lowered inside the barrel. Carrying plate 11 is locked to pedestal 30 with cutter 2 inside the barrel by swinging latch 22. Motor 4 is then started and cutter 2 is adjusted by set screws 16 and 17 until the proper depth of croze is cut. The operator then grasps handle 18 and causes cutting tool 2 to make one complete revolution inside the barrel which completes the croze and the shaping of the chine.

When the independent crozing machine of Figures 3, 4, 5 and 6 is employed the barrel is shaped in our barrel making machine by the stave bending dies or it may be shaped by any other barrel forming device and held in proper shape by trussing hoops or other means. The barrel is then placed centrally between pillar 20 and pedestal 30 of the machine shown in Fig. 6. Carrying plate 11 is lifted high enough for cutter 2 to clear the upper edge of the barrel and swung latterly so cutter 2 may be lowered inside the barrel. As carrying plate 11 is lowered centering clamps 19 engage the outer side of the barrel and hold it rigidly when swinging latch 22 on pedestal 30 is engaged in notch 21 in the end of carrying plate 11 which locks the crozing machine immovably with the barrel properly positioned by the clamps 19. Motor 4 is started which rotates cutter 2 at high speed; while the operator having grasped handle 18 causes the annular member 7 which carries the cutting tool to make a single rotation which causes cutter 2 to make a complete revolution in an exact circle inside of the barrel completing the formation of the croze and finishing the chine.

The barrel is then released and removed, another barrel put in proper position and the operation repeated.

Having thus described our invention and explained the construction and mode of using our machine we desire to secure Letters Patent of the United States to protect us in the exclusive use of the following claim.

We claim:

In a crozing machine the combination of an upstanding pillar, an upstanding pedestal, a carrying plate rotatably and slidably mounted upon the pillar, a bearing ring mounted upon the carrying plate, an annular member rotatably mounted in the bearing ring, a motor carrying bracket on the annular member, a motor having a projecting shaft mounted on the bracket, a croze cutting tool on the motor shaft, barrel clamping members on the carrying plate, means for clamping the free end of the carrying plate to the pedestal, means for revolving the rotating cutter about the inside of a barrel and means for conducting operating current to the motor.

TEAPHEL A. McMAHON.
WILLIAM HIERHOLZER.
WILLIAM GLAZAT.